United States Patent
Huang et al.

(10) Patent No.: US 9,191,852 B2
(45) Date of Patent: Nov. 17, 2015

(54) SYSTEM FOR TESTING WIRELESS SIGNALS AND METHOD FOR ESTABLISHING THE SAME

(71) Applicant: ARCADYAN TECHNOLOGY CORPORATION, Hsinchu (TW)

(72) Inventors: Tsung-Cheng Huang, Hsinchu (TW); Yung-Pei Chen, Hsinchu (TW); Ho-Chieh Hsiao, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 252 days.

(21) Appl. No.: 13/963,042

(22) Filed: Aug. 9, 2013

(65) Prior Publication Data
US 2014/0355457 A1    Dec. 4, 2014

(30) Foreign Application Priority Data
May 31, 2013   (TW) .............................. 102119417 A (51) Int. Cl.
*H04W 24/02*   (2009.01)
*H04W 24/10*   (2009.01)
*H04W 28/02*   (2009.01)

(52) U.S. Cl.
CPC .............. *H04W 28/02* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 8,620,301 B1 * | 12/2013 | Hessel | 455/423 |
| 2006/0229018 A1 * | 10/2006 | Mlinarsky et al. | 455/67.11 |
| 2010/0123471 A1 * | 5/2010 | Olgaard et al. | 324/754 |
| 2011/0257923 A1 * | 10/2011 | Boulton | 702/117 |
| 2011/0285450 A1 * | 11/2011 | McMillan et al. | 327/355 |
| 2012/0052816 A1 * | 3/2012 | Chang et al. | 455/67.12 |
| 2012/0231744 A1 * | 9/2012 | Gregg et al. | 455/67.12 |
| 2013/0093447 A1 * | 4/2013 | Nickel et al. | 324/750.16 |
| 2014/0073275 A1 * | 3/2014 | El-Hassan et al. | 455/115.3 |
| 2014/0098846 A1 * | 4/2014 | Emmanuel et al. | 375/224 |
| 2014/0161164 A1 * | 6/2014 | Emmanuel et al. | 375/224 |
| 2014/0179239 A1 * | 6/2014 | Nickel et al. | 455/67.14 |
| 2014/0194069 A1 * | 7/2014 | Liu et al. | 455/67.14 |
| 2014/0254392 A1 * | 9/2014 | Wolcott et al. | 370/242 |
| 2014/0315495 A1 * | 10/2014 | Joseph et al. | 455/67.11 |

FOREIGN PATENT DOCUMENTS

| | | |
|---|---|---|
| TW | 200718092 | 5/2007 |
| TW | M360366 U1 | 7/2009 |
| TW | 201307864 A1 | 2/2012 |

* cited by examiner

*Primary Examiner* — Redentor Pasia
(74) *Attorney, Agent, or Firm* — Li & Cai Intellectual Property (USA) Office (57) ABSTRACT

Disclosure herein is related to a system for testing wireless signals and a method provided for establishing the system. One of the objectives is to establish one new testing system while the method effectively reduces the unstable problem caused by hardware or environmental variations. The testing system measures intensity of the wireless signals outputted from a device-under-test. While compared to a test signals, it is determined if the signal intensities there-between are balanced. Accordingly, the hardware of system is required to be adjusted. After that, the wireless signals are compared with sample signals for determining whether or not the test results are stable among the different testing system. An attenuation value may be introduced to adjusting the test result. A new testing system is therefore established.

16 Claims, 6 Drawing Sheets

FIG.6

SYSTEM FOR TESTING WIRELESS SIGNALS AND METHOD FOR ESTABLISHING THE SAME

BACKGROUND OF THE INVENTION

1. Field of the Invention

The present invention is generally related to a wireless signal testing system and a method for establishing the system; in particular, the method is to acquire a qualified testing system by adjusting hardware and signals with determination of signal balance and accordance.

2. Description of Related Art

Since development of the modern wireless communication technology is getting mature, the end users may require higher quality of wireless communication. On the other hand, the manufacturer may develop various network facilities to cater to the needs of the different clients. For example, the network facility is such as the household network sharing machine, modem, or the network switch, router or access point for the wider area. The network facility may also be the router provided for the device to link mobile communication network.

To the need for the manufacturers' products shipping, the quality control is one of the most important steps. The quality control for the general wireless communication devices shipping is such as signal quality. The signal quality of the wireless signals of the network device is generally based on the examinations such as connection test, packet loss rate, received signal strength indicator (RSSI), data rate, and throughput for a period of time.

The conventional examination may meet the discrepancies among the testing machines and the unexpected hardware depletion resulting in signal error. Therefore, the unstable quality testing may cause poor product quality control. This drawback may be diminished by providing a golden sample to be a standard for compensation for the testing machines. However, the conventional examination may not substantially reduce the instability of the testing environment for the wireless communication device since the instability may result in low yield, high failure rate of retest, and error assessment because of hardware errors.

SUMMARY OF THE INVENTION

For providing a system to improve unstable testing results due to the variations among the testing machines, disclosure in the present invention is related to a wireless signal testing system and a method for establishing the system. One aspect of the invention is to establish a new testing system by processing an environmental test and eliminating the variations among the testing machines. The method effectively reduces the discrepant testing results and signal loss due to the hardware variations.

In one aspect of the present invention, the method for establishing the wireless signal testing system includes firstly measuring the signal intensity of the wireless signals outputted from a device-under-test (DUT). The device-under-test is such as a wireless communication device. The DUT may firstly receive test signals generated by a control-end device. The DUT then generates the wireless signals by its internal process. The method is then determine if the testing result is unstable due to the hardware variation, or the testing result is not consistent because the machines are discrepant.

In the method, it is determined that the variation between the signal intensities of the test signal and the wireless signals is larger than a first threshold. The determination is used to judge whether or not the signals are balance thereof. The related hardware facilities of the wireless signal testing system are adjusted based on the determination.

The next step in the method is to determine if the different of the test signal and a sample signal is larger than a second threshold. This determination is used to judge if the testing results for the two types of signals have undue variations at different testing systems. One or more attenuation values for the wireless signal testing system may be adjusted based on this determination. By repeatedly adjusting the hardware and the attenuation value of wireless signal testing system until the difference meets a standard, a new wireless signal testing system is therefore established.

The method according to one of the embodiments of the present invention may be applied to the system used to test wireless signals delivered over different bands of radio waves. For example, the wireless signals are at least carried over 2.4 GHz band waves and over 5 GHz band waves.

The system in accordance with the present invention is such as a wireless signal testing system. The system includes the major components including a signal input unit used to receive test signal and input the signal to a device-under-test; a signal receiving unit used to receive the wireless signals from the device-under-test; a signal intensity measurement unit used to measure the signal intensities of at least the test signal and the wireless signals; a first comparison unit used to compare the signals intensities measured respectively from the test signal and the wireless signals; a second comparison unit used to compare the signal intensity of the wireless signals from the device-under-test, and a sample data; and a signal adjusting unit which is used to adjust the signals outputted from the device-under-test according to the testing result made by the second comparison unit.

The mentioned test signal of the testing system may be generated by a control-end device; e.g. the network packets inputted to the device-under-test via an Ethernet network port. In the meantime, the control-end device may power the device-under-test by the power over Ethernet (PoE) technology. The mentioned signal adjusting unit may be implemented as the attenuators disposed at the signal processing device and the signal receiving device for receiving the wireless signals from the device-under-test.

Thus, if a testing environment is found with any unstable problem before introducing the wireless signal testing system and the method for establishing the system, the testing system renders a more accurate and stable environment for test. For example, if the yield of wireless communication device may not be raised and with high failure and retest rate, the testing system is served for raising the yield and effectively reducing retest and failure rate. Furthermore, the introduction of the testing system in accordance with the present invention allows the multiple testing machines to have a consistent testing standard since the system prevents the error because of the hardware. The invention is able to save testing time and cost.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In order to provide a wireless signal testing system which is able to reduce the unstable testing result caused by hardware or environmental discrepancies, provision in the present invention is related to a wireless signal testing system and a method for establishing the system. In which, the system established in accordance with the present invention may obtain consistent testing results among the different testing machines.

Figure 1:
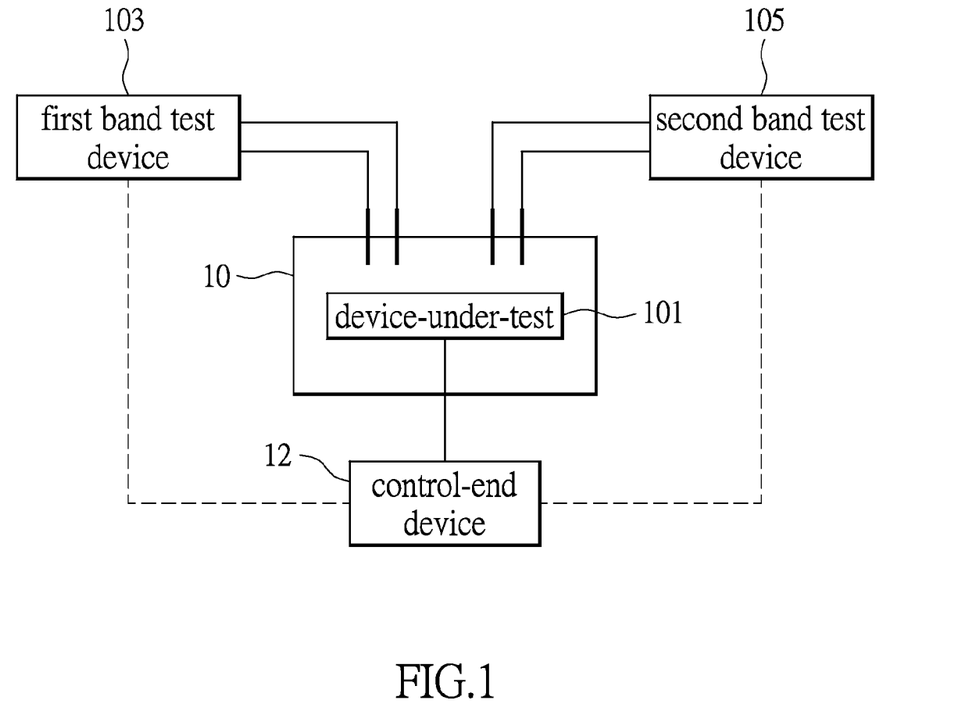
FIG. 1 shows a schematic diagram of the wireless signal testing system according to one embodiment of the present invention.

Reference is now made to FIG. 1 illustrating one of the embodiments of the wireless signal testing system. In this schematic diagram, a test carrier 10 is provided for disposing a device-under-test (DUT) 101. The device-under-test 101 may be a wireless communication device such as a wireless network sharing machine, a router, a wireless network switch, or a wireless access point (AP). For acquiring the wireless signals with less interference, the test carrier 10 is configured to have a space capable of signal shielding. The test carrier 10 is disposed with a connecting opening or a particular connecting port, by which an Ethernet cable such as RJ-45 cable may be used to connect with a control-end device 12. The control-end device 12 is made to a control host for the system. The control-end device 12 issues test signals to the device-under-test 101. For example, the test signals are such as the network packets carried over the Ethernet. The DUT 101 outputs wireless signals after receiving the test signals.

Next, the wireless signals are received by a testing device at the other end. The testing device may extract the signals over one or more radio frequency band. In an exemplary embodiment, the test parameters are configured to meet the requirements of at least two frequency bands. The diagram shows a first band test device 103 is driven to test the wireless signals over a specific frequency band, including signal intensity such as RSSI of the signals, or to judge the signal quality. Meanwhile, a second band test device 105 is also driven to test the signal quality or the signal intensity of the wireless signals over another frequency band.

Further, in one embodiment, the mentioned control-end device 12, the first band test device 103 and the second band test device 105 may be disposed into one host system. Therefore, the host system simultaneously performs the procedures including issuing the test signals, receiving signals, and measuring the signal intensity.

Figure 2:
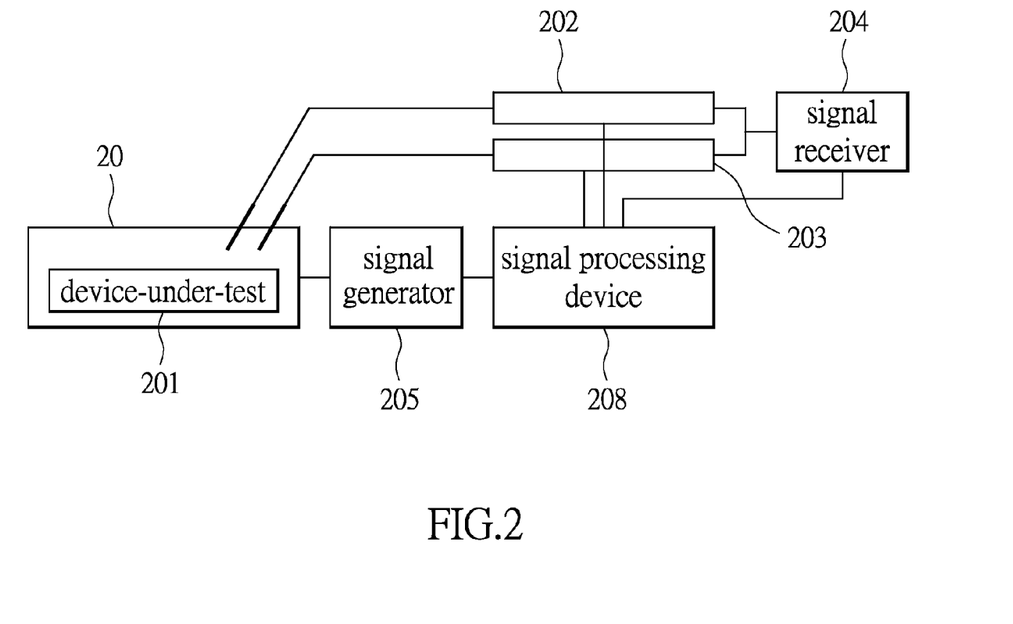
FIG. 2 shows a schematic diagram depicting the wireless signal testing system according to one embodiment of the present invention.

Reference is made to FIG. 2 showing a schematic diagram of the wireless signal testing system of the present invention.

In the present example, the system is disposed with a signal processing device 208 being a principal control host that manages the inside units. The control host performs signal generation, receiving, measurement and test. The signal processing device 208 outputs the test signals by a signal generator 205. The test signals are delivered to a DUT 201 via a cable.

The signal processing device 208 at another end connects to a signal receiver 204. The signal receiver 204 is driven by the signal processing device 208 to receive the wireless signals over a specific frequency band from the DUT 201. In the current example, the signal receiver 204 is used to receive the wireless signals by connecting with antenna of a test carrier 20. In the process of receiving the wireless signals, one or more attenuators 202, 203 may be incorporated to adjusting the signals. When the difference between the received signals and the testing result made by the DUT 201 at another system does not meet specific requirement, the attenuators 202, 203 may be used to perform compensation. Therefore, the testing results may be consistent in different testing machines.

The test carrier 20 is a carrier capable of signal shielding. The test carrier 20 is used to dispose the device-under-test 201. The device-under-test 201 is connected with the signal generator 205. The DUT 201 outputs wireless signals after receiving the test signals. The signal receiver 204 may receive the wireless signals and perform signal quality assessment such as measuring signal intensity.

Figure 3:
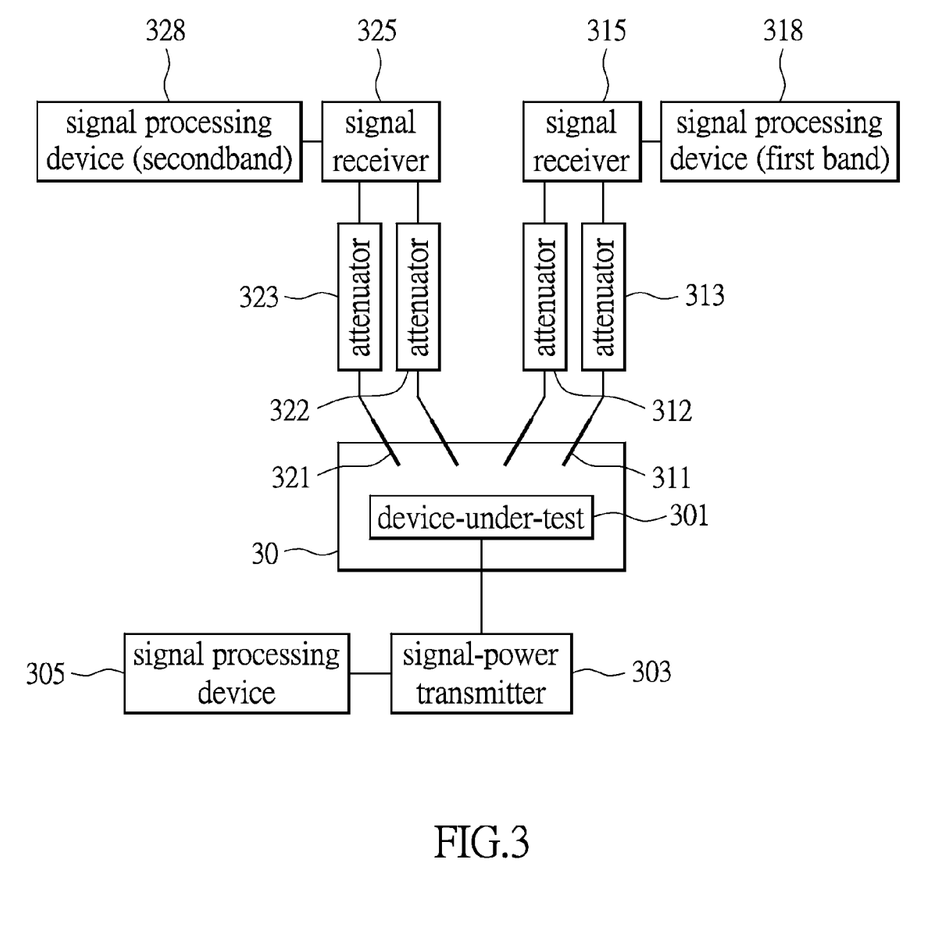
FIG. 3 schematically shows one further embodiment of the wireless signal testing system.

To the wireless communication device which is able to process the signals over different frequency bands, the wireless signal testing system according to one embodiment of the present invention is able to test the signals from DUT over different frequency bands. FIG. 3 schematically shows wireless signal testing system according to one embodiment of the present invention.

The system may be separated into a control side that includes a signal processing device 30 and a signal-power transmitter 303 at the control end; and a measurement side having a first band signal receiver 315, a second band signal receiver 325, a first band signal processing device 318, a second band signal processing device 328, multiple attenuators 312, 313, 322, 323, and sensors 311, 321.

The test carrier 30 carries the device-under-test 301. One end of the test carrier 30 is connected with the signal-power transmitter 303 and the signal processing device 305 at the control side. The test signals generated by the signal processing device 305 are such as the test packets carried over Ethernet. The test signals are transmitted to the DUT 301 through the signal-power transmitter 303. In an exemplary embodiment, the DUT 301 may be electrically powered by an external device, for example the signal-power transmitter 303 may be used to deliver the electric power. The electric power may be carried over Ethernet using a technology of power over Ethernet (PoE) to the DUT 301.

For example, the DUT 301 may be the wireless communication device able to process the signals over at least two frequency bands. When the DUT 301 receives the test signals, the DUT 301 converts the signals into wireless signals outputted over different frequency bands. The electromagnetic waves carried over the different frequency bands are respectively received by a first band signal receiver 315 and a second band signal receiver 325. After that, a first band signal processing device 318 and a second band signal processing device 328 respectively perform the related test, including measuring signal intensity of the signals within different frequency bands for assessing signal quality.

The wireless signal testing system performs at least two stages of test. One testing stage is to compare the signal intensities of the signals received by the signal receiving devices (315, 325) and the original test signals. Therefore, the comparison is used to determine whether or not the signal intensities of the received signals and the test signals are balance. The reason causing the signal depletion can be found through this comparison. The hardware of the system and the test environment may be the reason resulting in the signal depletion.

At one further testing stage, the testing results made by different testing machines are compared to determine if the testing environment is stable or/and the hardware is consistent. In case the unstable testing environment is employed, it may cause too large error resulting in problem of poor product yield. For example, a sample data may be introduced since the sample data is made by the same test process applied to testing the DUT 301 at another testing system. The sample data is used to compare the testing result as incorporating the same DUT 301 into the present testing system. The variation found in the comparison may be used to determine if the variations among the different testing machine is too large. The any compensation may be made by introducing attenuation values when the testing end receives the testing signals. The attenuation value made by the every attenuator 312, 313, 322, 323 may be referred to make the compensation. Through this compensation, the variations among the machines may be cured for the purpose of consistent testing environment.

The wireless signals generated by the DUT 301 may be carried over 2.4 GHz band wave or 5 GHz band wave. Thus, the wireless signal testing system includes signal processing devices (318, 328) and related circuits for testing the signal intensities of the signals carried over the 2.4 GHz frequency band and 5 GHz frequency band.

In the example that the testing signals are over the 2.4 GHz band waves, at least two types of test are provided. One of them is connection test that is used to test the signal intensity of the connection between the device-under-test and an external client. The inside test parameters are such as received signal strength indicator (RSSI, for example RSSI=−50 dBm±10 dBm), data rate (for example 130 Mbps), and the connection times. One other test type is throughput in the same frequency band. For example, the throughput within a period of time is measured for determining if it meets a specific standard.

In another example that the testing signals are over 5 GHz band waves, at least two types of test are also provided. The connection test may be used to measure the signal intensity of the connection between the device-under-test and an external client. The related test parameters are such as RSSI (for example −50 dBm±10 dBm), data rate (for example 300 Mbps), and the times to make the connection. The throughput in the same frequency band is one other test item. The throughput within a period of time may also be measured for determining if it meets a specific standard.

The above-mentioned test parameters may be applied to testing the various wireless communication devices. The content of test may include acquiring packet loss rate of the device-under-test, failure rate of wireless connection, determining if the RSSI meets a standard or imbalance, too low throughput, and determining if the data rate remains in certain level. The packet loss rate may be made by measuring ping loss.

Figure 4:
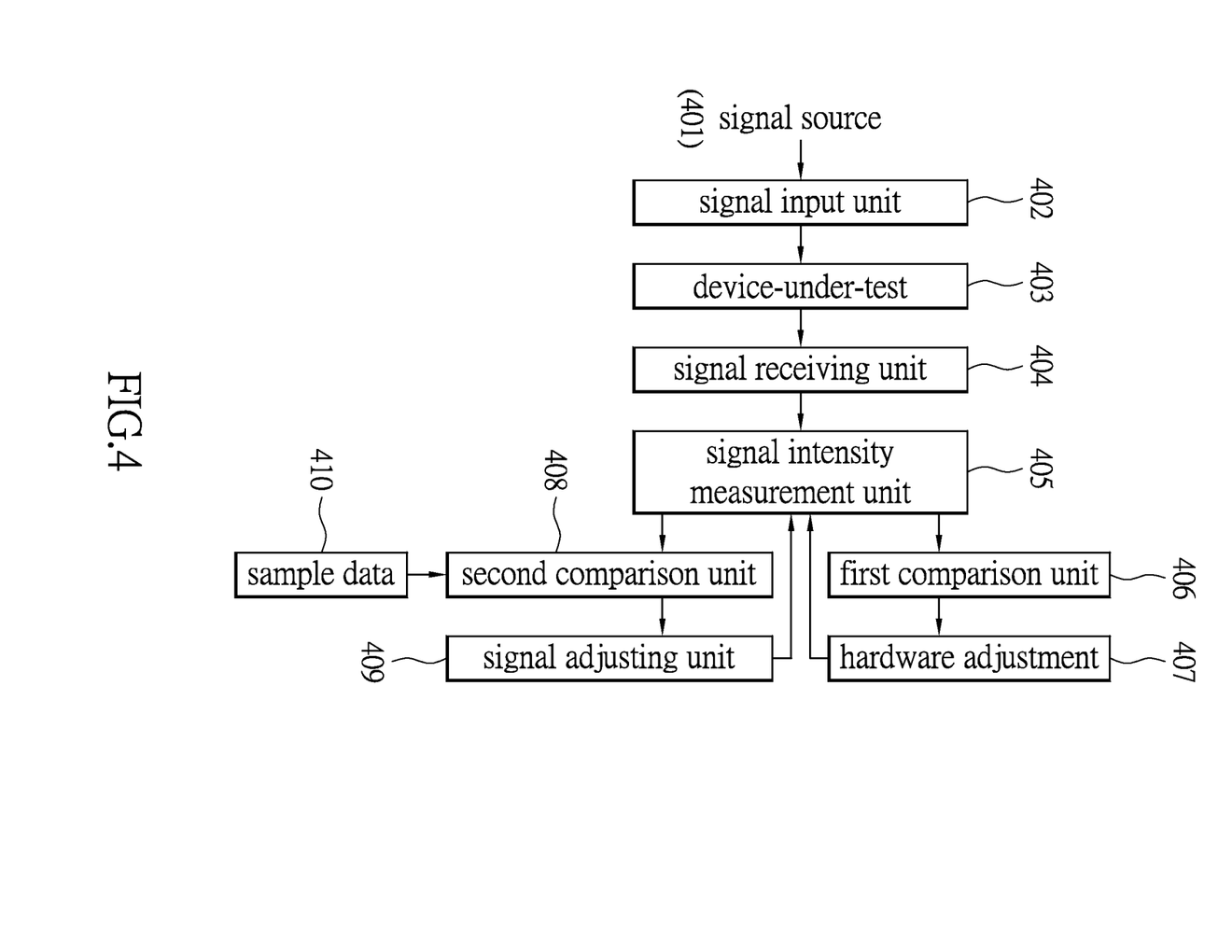
FIG. 4 shows functional blocks depicting the wireless signal testing system according to one embodiment of the present invention.

FIG. 4 shows the functional blocks depicting the wireless signal testing system according to one embodiment of the present invention.

The shown wireless signal testing system has a signal source 401. A control-end device generates test signals. The test signals are inputted to the device-under-test 403 through a signal input unit 402 of the system. While the device-under-test 403 processes the received test signals, the wireless signals over a specific wave band may be outputted. A signal receiving unit 404 then receives the wireless signals from the DUT, and measures the signal intensity. More specifically, a signal intensity measurement unit 405 receives the wireless signals and measures the signal intensity represented as RSSI.

In one embodiment, the test process may be divided into two test stages. The first stage is to test balance between the DUT and the test environment. In which, the signal intensity measurement unit 405 is used to measure the signal intensity of the original test signals. The unit 405 also measures the signal intensity of the wireless signals outputted from the DUT. After that, the signal intensities of the original test signals and the output of DUT are compared. The signals to be measured may be sampled in the same channel. A first comparison unit 406 is used to perform the comparison between the signal intensity or the equivalent data of test signals and the signal intensity of the wireless signals. Therefore, a hardware adjustment 407 of the system is incorporated to tuning the hardware according to the comparison result.

If the comparison referring to a first threshold appears imbalance between DUT and the test environment, the testing system is required to be tuned. The shown hardware adjustment 407 may involve the various signal lines, contacts, connectors and the testing machine as such which are the possible reasons resulting in the imbalance. For example, the network line such as RJ-45 cable should use shorter line for reducing the interference. Further, the network line should be fixed by fixture tenons. After tuning hardware of testing system, the process may be back to the steps of receiving signals and determining the balancing.

When the first test stage confirms the signal balance, the process goes to the second test stage. One of the objectives of the second test stage is to ensure the DUT may have the same or close testing results among the different testing machines. One major method of the second stage is to incorporate attenuators to adjust the output values of signal intensities measured from the different testing machines. Therefore, the test for the same DUT may obtain consistent result from the different machines. That will ensure accuracy of the following tests for the other DUTs.

A second comparison unit 408 then obtains the signal intensity measured from the output of the DUT 403. The signal intensity is compared with sample data 410. This sample data 410 is such as one of the testing results made by the DUT at another wireless signal testing system. The testing result may form the sample which is used to tune the other testing systems. A second threshold is incorporated to judging the difference between the testing result and sample data 410 in this moment. The related testing system may adjust the attenuation value of the signal adjusting unit 409 according to the comparison made by the second comparison unit 408. The adjustment of attenuation value allows tuning the output signals from the device-under-test 403.

The mentioned signal adjusting unit 409 may be attenuators configured at the signal receiving devices disposed in the every signal processing device and device-under-test 403. The testing system may be configured to have a default attenuation value, or alternatively adjusted by the control-end device. The adjustment of the attenuation values are used to ensure the balance among the different testing machines. The attenuation values are configured to perform a positive compensation or a negative compensation. By which, the negative compensation is applied if the output signal intensity is too high; the positive compensation can be applied if the output signal intensity is too low.

Similarly, the wireless signal testing system may simultaneously test the output signals made by the device-under-test 403 over different band waves. The wireless signals may be carried both over the 2.4 GHz band waves and the 5 GHz band waves. The system processes the signals over the different band waves in the same or different host systems, and then the hardware adjustment or attenuation value compensation is applied thereto.

Figure 5:
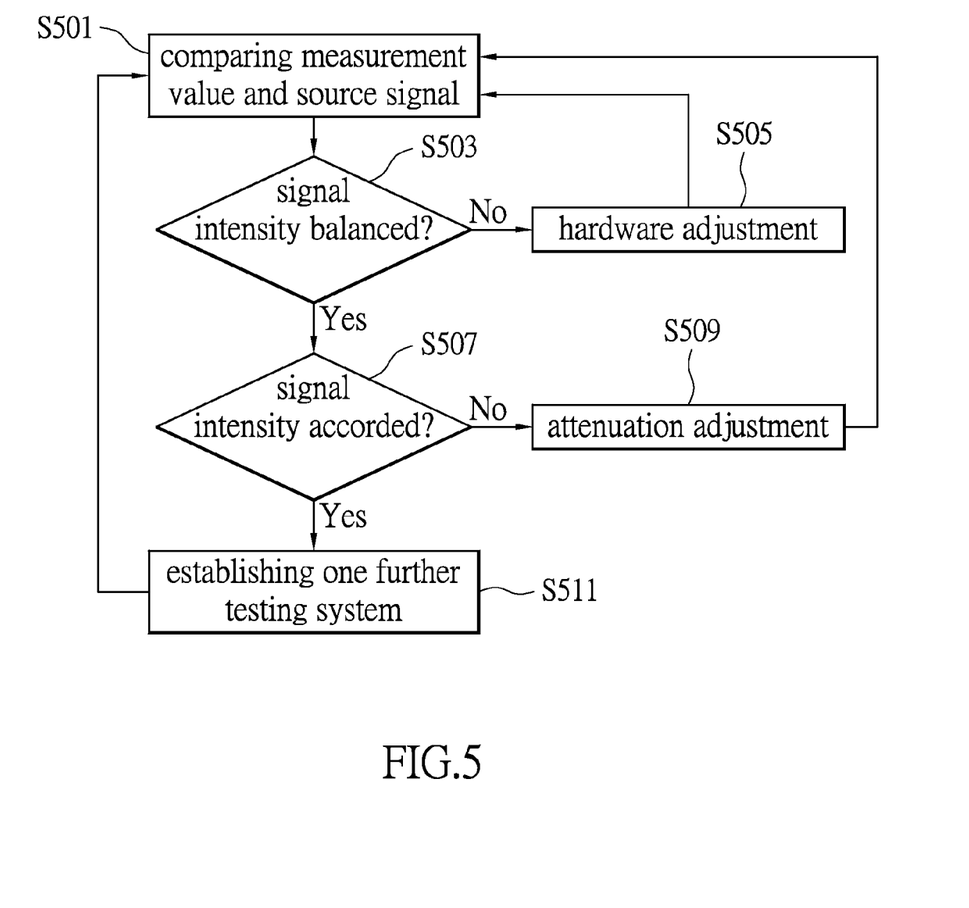
FIG. 5 shows a flow chart illustrating a method for establishing a wireless signal testing system according to one embodiment of the present invention.

Reference is made to FIG. 5, which shows a flow chart for illustrating the method for establishing the wireless signal testing system according to one embodiment of the present invention.

In the beginning, such as step S501, the system measures and compares the signal intensities of both the output signals of DUT and the source signals. Then comparison is made to the measurement so as to determine whether or not the signal intensity is balance, such as step S503. In which, a threshold may be incorporated to performing the determination. If the imbalance is found (no), it appears the hardware or testing environment causes some interferences. Thus the hardware adjustment is performed such as step S505. The adjusted system may continuously perform the testing when the process goes to the step S501. The hardware adjustment may be based on iterative comparison applied to the measurement value of output and the source signals.

When completing the hardware adjustment, such as step S507, the system determines if the signal intensities are consistent at different testing machines by comparing with a specific sample signal. If the discrepancy among the signal intensities is found, the necessary adjustment may be required if the discrepancy is too large. Such as step S509, the attenuation value may be incorporated to ensuring the testing results to be consistent among the different testing environments. Therefore, the system may provide accurate test under the consistent standard. Thus a new wireless signal testing system can be established (step S511) by repeatedly tuning hardware equipment (step S505) and attenuation value (step S509) until the difference among the machines meets a standard.

Figure 6:
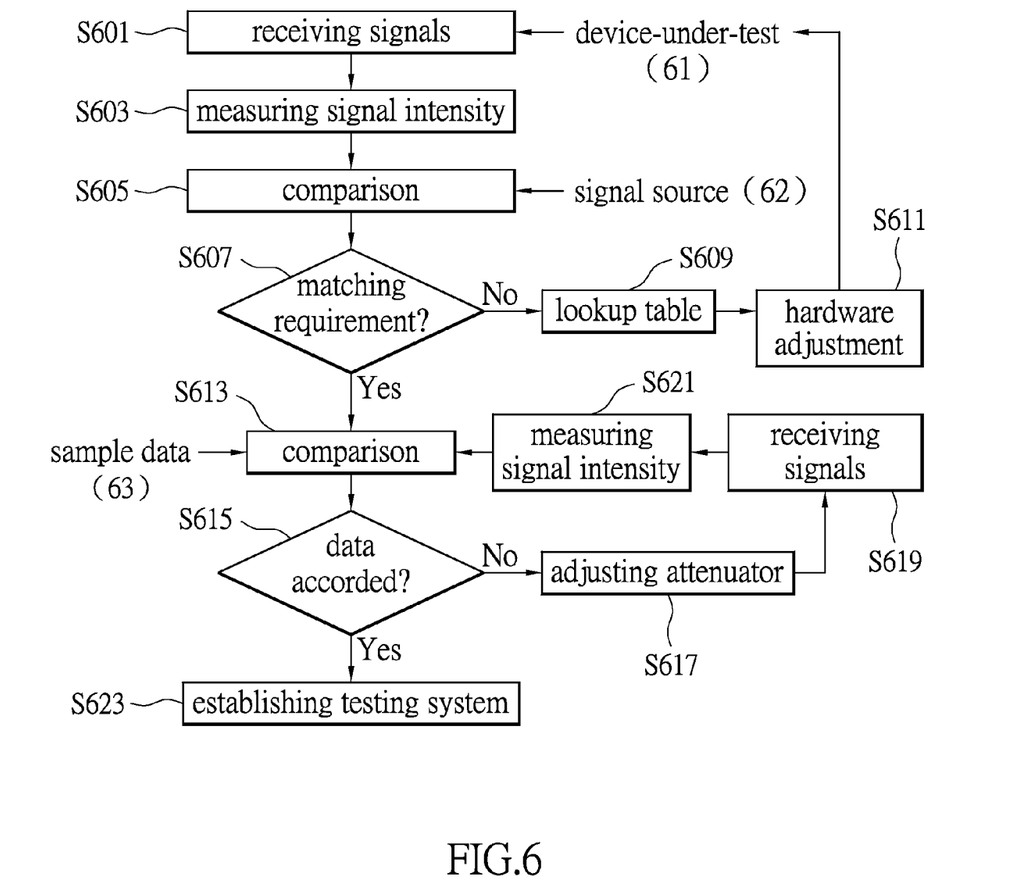
FIG. 6 shows another flow chart illustrating a method for establishing a wireless signal testing system according to one embodiment of the present invention.

FIG. 6 shows one further flow chart illustrating the wireless signal testing system in accordance with one embodiment of the present invention.

In this flow, the steps are used to describe some details of the method. The method includes at least two test stages. One test stage is to find the possible interferences made by hardware through the signal difference. Step S601 shows a beginning step, in which the system receives the wireless signals generated by the DUT (61). Next, such as step S603, the signal intensities of output of the DUT are measured. The signal intensities involve the measurement of the original test signals inputted to the DUT. The signal intensity of the test signal may be provided by the control-end device. The next step such as step S605 shows comparing the signal intensity of the test signal from a signal source (62) and the signal intensity of output of the DUT.

In the process of comparison, a first threshold may be introduced to be operated as a standard. Such as step S607, the first threshold is used to determine whether or not the signal intensity outputted from the device-under-test meets depletion due to the hardware equipment. When the difference of the signal intensities of the test signals and the wireless signals generated by the DUT is larger than the first threshold, it shows failing to meet the standard (no), and determines the portion required to be adjusted according to a lookup table in an exemplary embodiment (step S609). Next, such as step S611, the hardware equipment of the wireless signal testing system is required to be tuned. The process then goes to step S601 for repeatedly adjusting the hardware for reducing the interferences made by the hardware.

The current test stage may acquire a preliminary testing result, by which it is determined that whether or not the signal intensities (for example the RSSI) of the DUT and the control-end device are in balance condition under different frequency bands such as 5 GHz and 2.4 GHz. For example, it is determined to be under a balance condition if the signal intensities of the DUT and the control-end device are within a range such as $45 \leq RSSI \leq 55$, and also the difference therebetween is within a specific dB value (for example 5 dB).

On the contrary, if the difference between the signal intensities of the DUT and the control-end device exceeds a threshold, it is determined the signal intensities are in imbalance condition. In the meantime, the process goes on examining the testing environment, including examining power setting of the communication circuit disposed in the device-under-test. For example, the interference such as cross talk may be prevented when separating the connector of the antenna on the circuit board of DUT. Thus, the circuit trace may be configured to by passing the printed antenna. Further, the circuits on the antenna circuit board should be prevented from winded around the antenna. Still further, the antenna cable connector should be ensured to securely connect to the circuit board of the device-under-test, for example the junction portions associated to the antenna, the attenuators, and the related cables are securely bolted. For example, the attenuation values may be reduced if the signal intensity of the control-end device is too low. The examination also includes testing if the cable and the attenuator are suitable connected for preventing the cable loss resulting in the discrepancy among the different testing machines. Some other adjustment terms may include confirming any damage of the bottom absorber of the shielding box, position of the fixture plate placed in the shielding box, and suitable spacing between the DUT and the antenna fixture plate.

After the hardware adjustment, again the signal intensity of the adjusted hardware is compared with the sample data (63), such as step S613. The sample data 63) is such as a standard data for comparison reference to the system. The sample data (63) may also be the testing result generated from the same DUT but at one another wireless signal testing system. The sample data (63) is therefore used to examine whether or not the same device-under-test has the consistent testing result at different wireless signal testing systems.

Next, such as step S615, a further second threshold is introduced to examining the consistency among the data. The second threshold is further introduced to examining whether or not the device-under-test has different testing results at different wireless signal testing systems. If the difference is smaller than this second threshold, it obviously shows the system adjustment is completed. A new testing system is therefore established such as step S623.

If the examination shows the measured value is inconsistent with the sample data (63), and the difference is larger than the second threshold, the attenuators are incorporated to performing compensation in step S617. In the current test stage, the negative or positive compensation using the attenuators is performed to meet the consistency.

While the compensation to the system is completed, the step in the method goes to step S619, the system reinstates receiving the wireless signals generated by the DUT, and measuring the signal intensities (step S621). The above-described test and adjustment of attenuation value are processed under the result meets the requirement. The new wireless signal testing system is established (step S623).

Thus the system and method for establishing the system in accordance with the present invention is able to provide a stable and reliable testing environment for the general wireless communication device. The invention effectively reduces possibility of poor product quality. Further, a sample data is introduced to the comparison allows establishing a new and consistent testing system for improving the productivity.

It is intended that the specification and depicted embodiment be considered exemplary only, with a true scope of the invention being determined by the broad meaning of the following claims.

What is claimed is:

1. A method for establishing a wireless signal testing system, comprising:
    measuring signal intensity of wireless signals received from a device-under-test, wherein the device-under-test generates the wireless signals as receiving a test signal; and
    establishing a new wireless signal testing system by repeatedly tuning hardware equipment and an attenuation value of wireless signal testing system until a difference meets a standard, in which the hardware equipment of the wireless signal testing system is tuned when the difference between the test signal and the measured signal intensity is bigger than a first threshold wherein the first threshold is used to determine whether or not the signal intensity outputted from the device-under-test meets depletion due to the hardware equipment and wherein the attenuation value for the wireless signal testing system receiving the wireless signals is adjusted when the difference between the test signal and a sample signal is bigger than a second threshold wherein the second threshold is used to determine whether or not the device-under-test causes different testing results at different wireless signal testing systems.

2. The method according to claim 1, wherein the device-under-test is a wireless communication device and the test signal is as network packets inputted to the wireless communication device.

3. The method according to claim 2, wherein the wireless communication device converts the network packets to the wireless signals.

4. The method according to claim 3, wherein the wireless signals include signals carried by different bands.

5. The method according to claim 4, wherein the wireless signals at least include the signals respectively carried by 2.4 GHz band waves and 5 GHz band waves.

6. The method according to claim 1, wherein the sample signal is one of the different testing results made by the device-under-test at another wireless signal testing system.

7. A wireless signal testing system, comprising:
    a signal input unit receiving a test signal and inputting the test signal to a device-under-test;
    a signal receiving unit receiving wireless signals outputted from the device-under-test;
    a signal intensity measurement unit measuring signal intensities of the test signal and the wireless signals outputted from the device-under-test;
    a first comparison unit used to compare the signal intensities of the test signal and the wireless signals from the device-under-test in which hardware equipment of the wireless signal testing system is tuned when a difference between the test signal and the measured signal intensity compared by the first comparison unit is bigger than a first threshold wherein the first threshold is used to determined whether or not the signal intensity outputted from the device-under-test meets depletion due to the hardware equipment;
    a second comparison unit used to compare the signal intensities of the wireless signals from the device-under-test and a sample data in which an attenuation value for the wireless signal testing system receiving the wireless signals is adjusted when the difference between the test signal and a sample signal compared by the second comparison unit is bigger than a second threshold wherein the second threshold is used to determine whether or not the device-under-test causes different testing results at different wireless signal testing systems; and
    a signal adjusting unit used to adjust the wireless signals outputted from the device-under-test according to one of the different testing result of the second comparison unit;
    thereby a new wireless signal testing system is established by repeatedly tuning the hardware equipment and the attenuation value of the wireless signal testing unit the difference meets a standard.

8. The system according to claim 7, wherein the device-under-test is a wireless communication device; and the test signal is network packets inputted to the wireless communication device.

9. The system according to claim 8, wherein the wireless communication device converts the network packets to the wireless signals.

10. The system according to claim 9, wherein the test signal is generated by a control-end device, and inputted to the device-under-test via an Ethernet network port.

11. The system according to claim 10, wherein the control-end device electrically powers the device-under-test by a power-over-Ethernet technology.

12. The system according to claim 10, wherein the wireless signals outputted from the device-under-test include signals carried by different band waves.

13. The system according to claim 12, wherein the wireless signals are carried respectively over a 2.4 GHz band wave and a 5 GHz band wave.

14. The system according to claim 13, wherein the wireless signal testing system includes at least two signal processing devices which are respectively used to test signal intensities of the signals carried by the 2.4 GHz band wave and the 5 GHz band wave.

15. The system according to claim 14, wherein the signal adjusting unit is an attenuator disposed at a signal receiving device, which is used to receive the wireless signals outputted by the device-under-test, in each of the at least two signal processing devices.

16. The system according to claim 7, wherein the sample data is one testing result generated from the device-under-test in another wireless signal testing system.

* * * * *